(12) United States Patent
Eschenbeck et al.

(10) Patent No.: US 11,325,458 B2
(45) Date of Patent: May 10, 2022

(54) TRANSMISSION FOR A MOTOR VEHICLE

(71) Applicant: ZF Friedrichshafen AG, Friedrichshafen (DE)

(72) Inventors: Linus Eschenbeck, Wangen (DE); Hermann Thurn, Eckersdorf (DE); Matthias Held, Schnabelwaid (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 119 days.

(21) Appl. No.: 16/633,220

(22) PCT Filed: Jun. 29, 2018

(86) PCT No.: PCT/EP2018/067579
§ 371 (c)(1),
(2) Date: Jan. 23, 2020

(87) PCT Pub. No.: WO2019/020314
PCT Pub. Date: Jan. 31, 2019

(65) Prior Publication Data
US 2020/0180423 A1   Jun. 11, 2020

(30) Foreign Application Priority Data
Jul. 24, 2017 (DE) .................. 10 2017 212 677.9

(51) Int. Cl.
*B60K 1/00* (2006.01)
*B60K 6/405* (2007.10)
(Continued)

(52) U.S. Cl.
CPC ............ *B60K 6/405* (2013.01); *B60K 1/00* (2013.01); *B60K 17/08* (2013.01); *F16H 57/02* (2013.01);
(Continued)

(58) Field of Classification Search
CPC .......... B60K 6/405; B60K 1/00; B60K 17/08; B60K 6/54; B60K 6/547; B60K 2001/001;
(Continued)

(56) References Cited

U.S. PATENT DOCUMENTS 7,847,450 B2   12/2010  Kakuda et al.
9,718,356 B1 *  8/2017  Ikeda ................ B60K 6/36
(Continued)

FOREIGN PATENT DOCUMENTS

DE   112009000022 T5   7/2010
DE   112009000057 T5   10/2010
(Continued)

OTHER PUBLICATIONS

International Search Report (English Translation PCT/EP2018/067579), dated Sep. 13, 2018. (3 pages).
(Continued)

*Primary Examiner* — David J Hlavka
(74) *Attorney, Agent, or Firm* — Dority & Manning, P.A.

(57) ABSTRACT

A transmission (G) for a motor vehicle includes a housing (GG), a gear set (RS) arranged within the housing (GG), an electric machine (EM), and a power electronics module (LE). The power electronics module (LE) includes a carrier element (S), a DC voltage terminal (DC), an inverter (INV), and an AC voltage terminal (AC). The housing (GG) includes, on an outer wall (GGA), a region (GGE) for accommodating the power electronics module (LE), which is closable with the carrier element (S) of the power electronics module (LE). The region (GGE) of the housing (GG) and an inner side (SI) of the carrier element (S) form a dry space (TR) for accommodating the inverter (INV), which is attached to the carrier element (S). The region (GGE) of the housing (GG) at least partially separates the gear set (RS) from the dry space (TR).

17 Claims, 8 Drawing Sheets

(51) Int. Cl.
  *B60K 17/08* (2006.01)
  *F16H 57/02* (2012.01)
  *F16H 57/04* (2010.01)
  *F16H 61/00* (2006.01)
  *B60K 6/54* (2007.10)

(52) U.S. Cl.
  CPC ..... *F16H 57/0467* (2013.01); *F16H 61/0006* (2013.01); *B60K 6/54* (2013.01); *B60Y 2400/61* (2013.01); *F16H 2057/02026* (2013.01); *F16H 2057/02034* (2013.01); *F16H 2057/02043* (2013.01)

(58) Field of Classification Search
  CPC .. B60K 6/40; B60K 6/48; F16H 57/02; F16H 57/0467; F16H 61/0006; F16H 2057/02026; F16H 2057/02034; F16H 2057/02043; B60L 15/007; B60L 50/16
  See application file for complete search history.

(56) References Cited

U.S. PATENT DOCUMENTS

| | | | | |
|---|---|---|---|---|
| 10,122,247 | B2* | 11/2018 | Hattori | .................. H02K 11/30 |
| 2009/0243443 | A1 | 10/2009 | Aoki et al. | |
| 2009/0251018 | A1 | 10/2009 | Koshida | |
| 2015/0251531 | A1 | 9/2015 | Hotta et al. | |
| 2016/0052380 | A1 | 2/2016 | Miyazawa et al. | |
| 2016/0254719 | A1* | 9/2016 | Pondelek | .................. H02K 5/08 310/54 |
| 2016/0268875 | A1* | 9/2016 | Roos | ...................... H02K 11/33 |
| 2017/0100998 | A1 | 4/2017 | Suzuki et al. | |
| 2017/0158042 | A1 | 6/2017 | Miyazawa et al. | |
| 2017/0232831 | A1 | 8/2017 | Agata et al. | |

FOREIGN PATENT DOCUMENTS

| | | |
|---|---|---|
| DE | 102010002746 A1 | 9/2011 |
| DE | 112013002854 T5 | 2/2015 |
| DE | 102015101024 A1 | 8/2015 |
| DE | 112014001863 T5 | 12/2015 |
| DE | 112015001689 T5 | 1/2017 |
| DE | 112015004417 T5 | 7/2017 |
| EP | 3112197 A1 | 1/2017 |
| JP | 2014069755 A | 4/2014 |
| JP | 2014113915 A | 6/2014 |
| JP | 2015220830 A | 12/2015 |
| WO | WO 2011/110253 | 9/2011 |

OTHER PUBLICATIONS

German Search Report DE 10 2017 212 677.9, dated Apr. 9, 2018. (12 pages).

* cited by examiner

TRANSMISSION FOR A MOTOR VEHICLE

CROSS-REFERENCE TO RELATED APPLICATION

The present application is related and has right of priority to International Application No. PCT/EP2018/067579 filed on Jun. 29, 2018, published as WO 2019/020314, and to German Patent Application No. 10 2017 212 677.9 filed on Jul. 24, 2017, both of which are incorporated by reference in their entirety for all purposes.

FIELD OF THE INVENTION

The invention relates generally to a transmission for a motor vehicle, and to a motor vehicle including such a transmission.

BACKGROUND

The unexamined patent application DE 10 2010 002 746 A1 of the applicant describes such a transmission, which includes an electric machine arranged within a bell housing of the transmission housing. The electric machine is coupled to an associated power electronics unit. The power electronics unit is provided in a cover structure of the transmission housing and is connected to the electric machine via a phase interface. The cover structure is detachably attached to the transmission housing in the region of the bell housing radially below the electric machine. Due to such a connection of the power electronics unit, the ground clearance of a motor vehicle including such a transmission is reduced.

SUMMARY OF THE INVENTION

As used herein, a transmission refers, in particular, to a multi-stage transmission, in which a multitude of gear ratios, i.e., fixed ratios between an input shaft and an output shaft of the transmission, are preferably automatically shiftable with the aid of shift elements. In this case, the shift elements are clutches or brakes, for example. Such transmissions are utilized primarily in motor vehicles in order to adapt the rotational speed characteristic and the torque output characteristic of the drive unit to the driving resistances of the vehicle in a suitable way.

Example aspects of the invention develop the transmission known from the prior art in such a way that the transmission has a compact overall height without substantially increasing the outer dimensions of the transmission.

The transmission includes a housing, a gear set arranged within the housing for forming multiple gear ratios between an input shaft and an output shaft of the transmission, an electric machine, and a power electronics module. The electric machine is operatively connected to the input shaft, to the output shaft, or to an element of the gear set.

The power electronics module includes a carrier element having an inner side and having an outer side, a DC voltage terminal, an inverter, and an AC voltage terminal. The AC voltage terminal is connected, preferably detachably connected, to a phase interface of the electric machine.

The housing includes, on an outer wall, a region for accommodating the power electronics module. This region is closable with the aid of the carrier element of the power electronics module. The outer wall of the housing and the inner side of the carrier element form a dry space, in which the inverter is accommodated. The inverter is attached to the carrier element. The region of the housing in which the power electronics module is accommodated separates, at least in sections or in part, the gear set of the transmission from the dry space of the inverter.

Due to the cooperation of the transmission housing and the carrier element of the power electronics module, a separate housing of the power electronics module can be dispensed with or omitted. Due to the formation of the dry space in the region of the gear set, the available installation space can be utilized in a particularly efficient manner. This is the case because the gear set frequently has a round, or at least rounded, cross-section, which is smaller than the cross-section of the electric machine. Due to the utilization of the installation space in the region of the gear set for the power electronics module, the entire cross-section of the transmission is therefore only slightly enlarged.

Preferably, the power electronics module is arranged laterally on the transmission. In this case, "laterally" is understood to mean an arrangement in which the power electronics unit is not arranged above or below the transmission housing, but rather on an outer side of the transmission housing. In the case of a transmission for a motor vehicle drive train aligned in parallel to the direction of travel, the power electronics module is therefore directed or positioned toward one side of the vehicle.

According to one preferred example embodiment, the transmission includes an input shaft interface and an output shaft interface. Via the input shaft interface, power is transmittable from a transmission-external drive unit to the input shaft of the transmission, if necessary by engaging a separating clutch or a launch clutch. Via the output shaft interface, power is transmittable from the output shaft to driving wheels of a motor vehicle equipped with the transmission. The power path between the output shaft and the driving wheels can include one or multiple differential gear(s) and further drive train shafts. The input shaft interface and the output shaft interface are arranged on opposite ends of the transmission. The power electronics module is arranged between the input shaft interface and the output shaft interface, and extends, at least in sections, up to above the lowermost third of the overall height of the transmission housing. In this case, "overall height" is understood to mean the vertical dimension of the transmission housing in the installation position in the motor vehicle.

Preferably, the housing region for accommodating the power electronics module is located between a lower edge of the transmission housing and one-half of the overall height of the transmission housing. The housing region extends, at least in sections, above the lowermost third of the overall height of the transmission housing. In such an embodiment, at least one portion of the AC voltage terminal can be arranged in the section of the power electronics module that extends above the lowermost third of the overall height of the transmission housing.

Preferably, the power electronics module has, in sections, a smaller overall height than the third of the overall height of the transmission housing. In such an embodiment, the DC voltage terminal can be arranged in the section of the power electronics module that has a smaller overall height than the third of the overall height of the transmission housing.

According to one preferred example embodiment, the power electronics module extends, to a preponderant extent, along the lowermost third of the overall height of the transmission housing. In other words, a better part of the power electronics module is arranged along the lowermost third of the transmission housing. As a result, an interior space of the motor vehicle including such a transmission is not reduced in size.

Preferably, the carrier element includes openings, which are closable with the aid of one or multiple cover(s). With the aid of the openings, assembly and/or maintenance work on the transmission can be made possible without detaching the power electronics module from the transmission. For example, the AC voltage terminal can be arranged on the inner side of the carrier element, wherein the AC voltage terminal is accessible through the openings starting from an outer side of the carrier element. This provides for a contacting of the AC voltage terminal to the phase interface of the electric machine after the power electronics module has been attached to the transmission housing.

According to one preferred example embodiment, the DC voltage terminal is arranged on the outer side of the carrier element. This facilitates the establishment of an electrically conductive connection between a battery of the motor vehicle and the DC voltage terminal during the installation of the transmission into the motor vehicle.

Preferably, the power electronics module incudes a cooling water/fluid inflow connection and a cooling water/fluid outflow connection, which are arranged on the outer side of the carrier element. Via the cooling water/fluid inflow connection, cooling water/fluid can be routed to the power electronics module, in particular for cooling the power semiconductor of the inverter. Via the cooling water/fluid outflow connection, the cooling water/fluid can be routed out of the power electronics module.

Preferably, the power electronics module includes a signal connector, which is arranged on the outer side of the carrier element. The signal connector is configured for transmitting signals between an element of the power electronics module and a transmission-external control unit.

By providing the various interfaces of the power electronics module on the carrier element, the power electronics module can be attached to the transmission housing, having been put through a final check and preassembled.

According to one preferred example embodiment, the carrier element includes a pressure compensating element, with the aid of which the dry space is connected to the surroundings. As a result, an accumulation of moisture in the dry space, induced by a pressure difference between the surroundings and the dry space, can be avoided. Alternatively, the carrier element can include a connection for a vent line, with the aid of which the dry space is connected to the surroundings. The free end of the vent line can be arranged in a high-level and water-protected region in the motor vehicle, which is equipped with such a transmission. According to a further alternative example, the dry space can be connected to the surroundings via at least one bore hole in the housing. The free end of this bore hole is preferably arranged in a high-level and water-protected region of the transmission. In such an embodiment, the venting of the dry space takes place via this bore hole.

The transmission can be an integral part of a motor vehicle. The motor vehicle includes, in addition to the transmission, an internal combustion engine, which is torsionally elastically connected or connectable to the input shaft of the transmission via a torsional vibration damper. The output shaft of the transmission is drivingly operatively connected to a transmission-internal or transmission-external differential gear, which is operatively connected to wheels of the motor vehicle. The motor vehicle including the transmission allows for multiple drive modes of the motor vehicle. In an electric mode, the motor vehicle is driven by the electric machine of the transmission. In an internal combustion engine-operated mode, the motor vehicle is driven by the internal combustion engine. In a hybrid mode, the motor vehicle is driven by the internal combustion engine as well as by the electric machine of the transmission.

BRIEF DESCRIPTION OF THE DRAWINGS

Exemplary embodiments of the invention are described in detail in the following with reference to the attached figures. Wherein.

DETAILED DESCRIPTION

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 1:
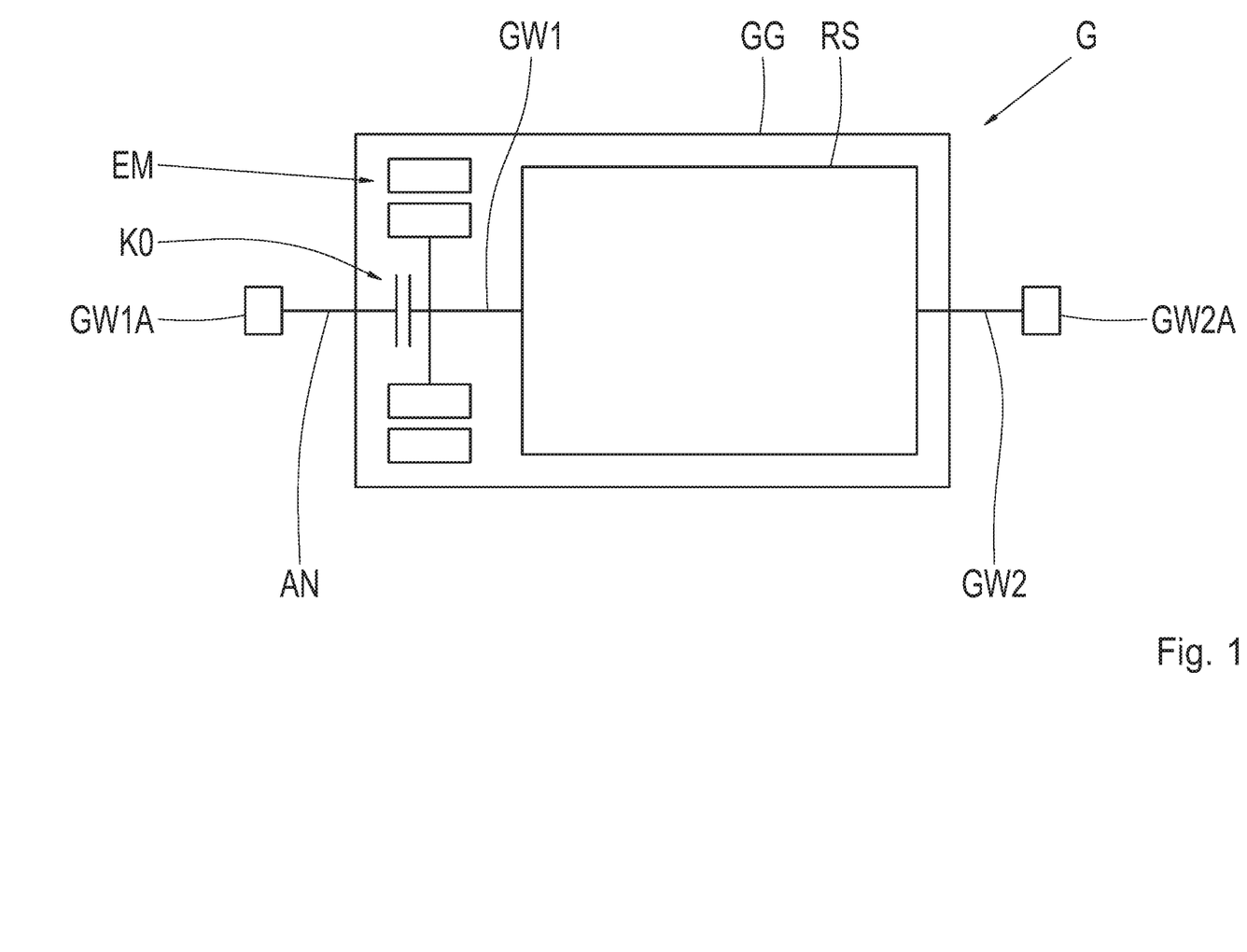
FIG. 1 through FIG. 3 each show a diagrammatic view of a transmission for a motor vehicle.

FIG. 1 shows a diagrammatic view of a transmission G for a motor vehicle. The transmission G includes a housing GG, a gear set RS arranged within the housing GG, and an input shaft GW1 and an output shaft GW2. The gear set RS is utilized for forming multiple gear ratios between the input shaft GW1 and the output shaft GW2. Moreover, the transmission G includes an electric machine EM, whose rotor is operatively connected to the input shaft GW1. The input shaft GW1 is connected to a connection shaft AN of the transmission G via a clutch K0. An input interface GW1A is formed on the connection shaft AN. An output interface GW2A is formed on the output shaft GW2. The input interface GW1A and the output interface GW2A are arranged on opposite ends of the transmission G. The housing GG encloses, in addition to the gear set RS, the separating clutch K0 and the electric machine EM.

Figure 2:
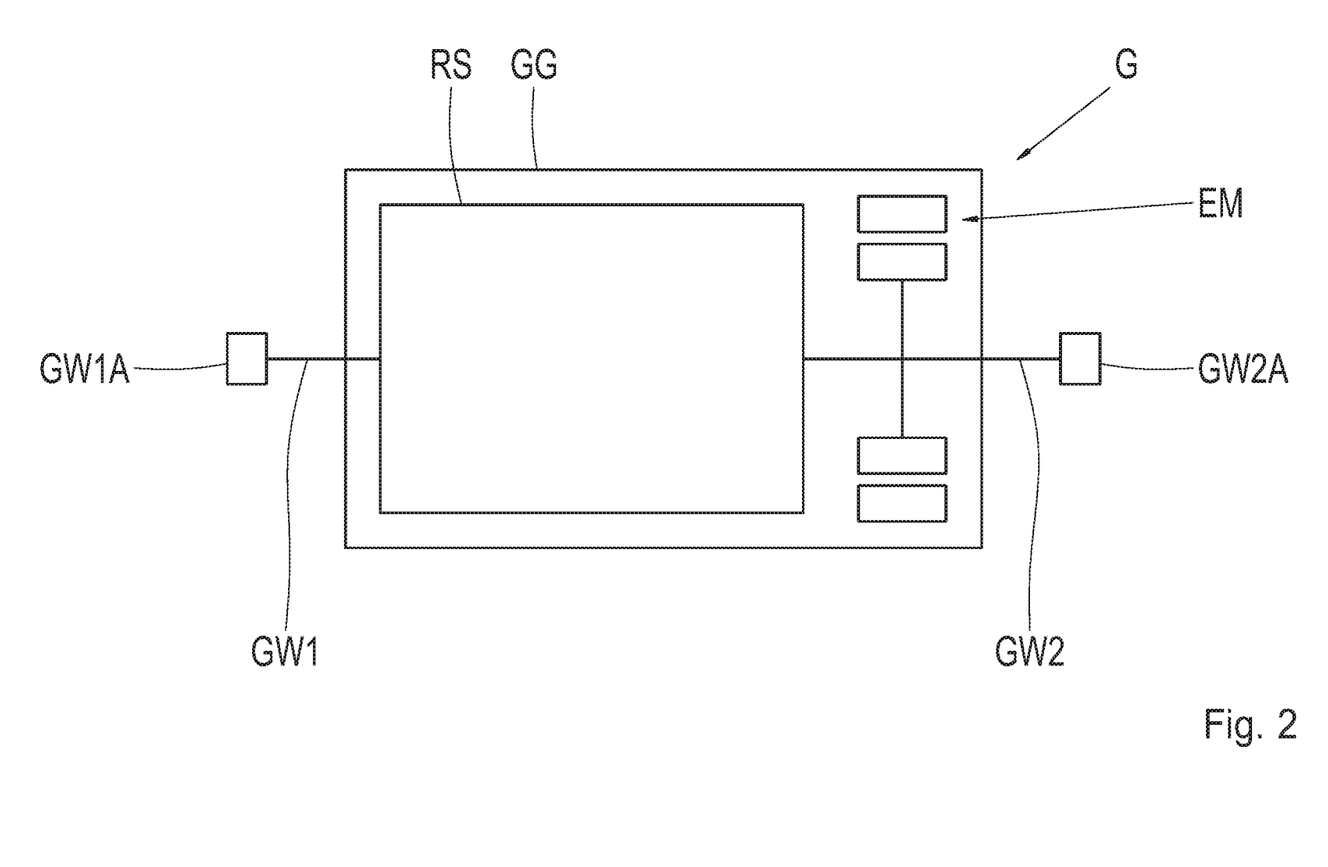

FIG. 2 shows a diagrammatic view of a transmission G, which essentially corresponds to the transmission G represented in FIG. 1. The rotor of the electric machine EM is now operatively connected to the output shaft GW2. The connection shaft AN and the separating clutch K0 are omitted, so that the input interface GW1A is formed on the input shaft GW1.

Figure 3:
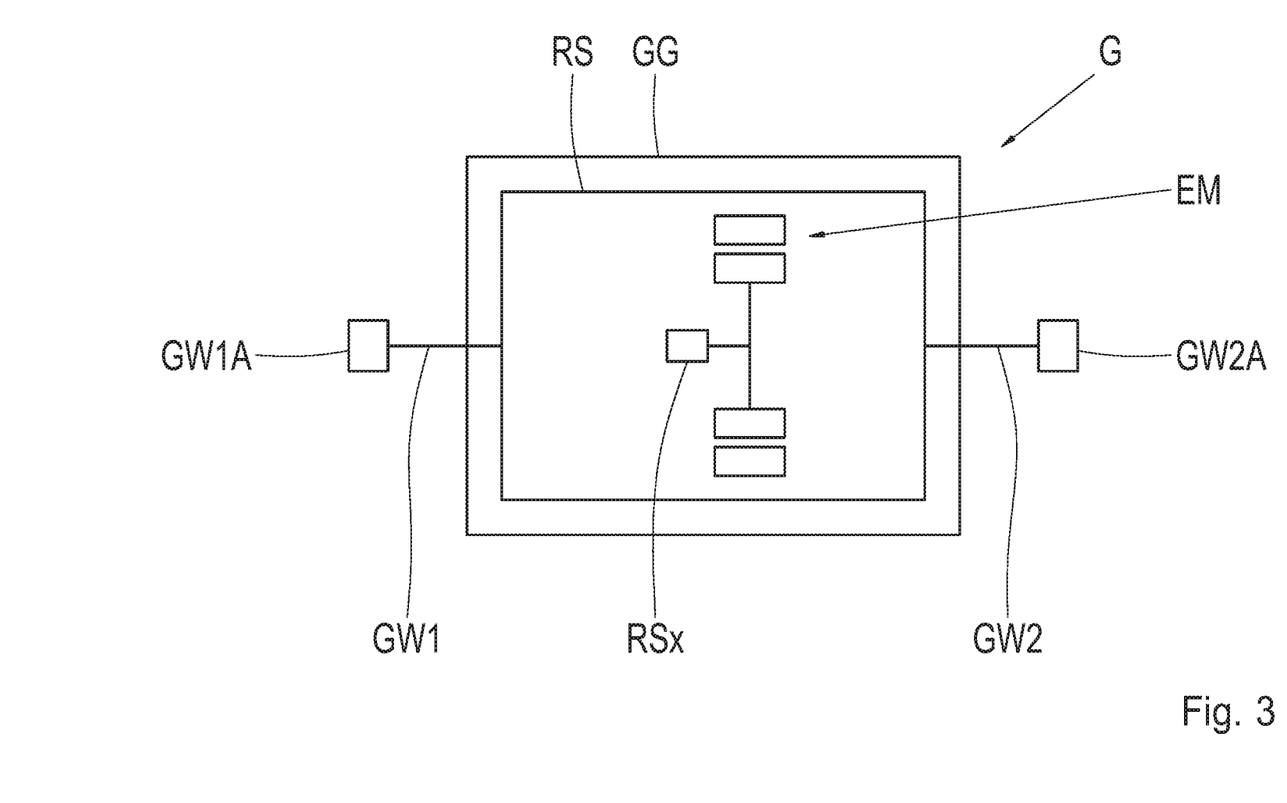

FIG. 3 shows a diagrammatic view of a transmission G, which essentially corresponds to the transmission G represented in FIG. 1. The rotor of the electric machine EM is now operatively connected to an element RSx of the gear set RS. The connection shaft AN and the separating clutch K0 are omitted, so that the input interface GW1A is formed on the input shaft GW1.

The transmissions G represented in FIG. 1 through FIG. 3 are to be considered merely as examples. In example embodiments according to FIG. 2 and FIG. 3, for example, a separating clutch K0 and a connection shaft AN could also be provided. Each of the transmissions shown by way of example could include a torque converter, which is arranged between the connection shaft AN and the gear set RS.

Figure 4:
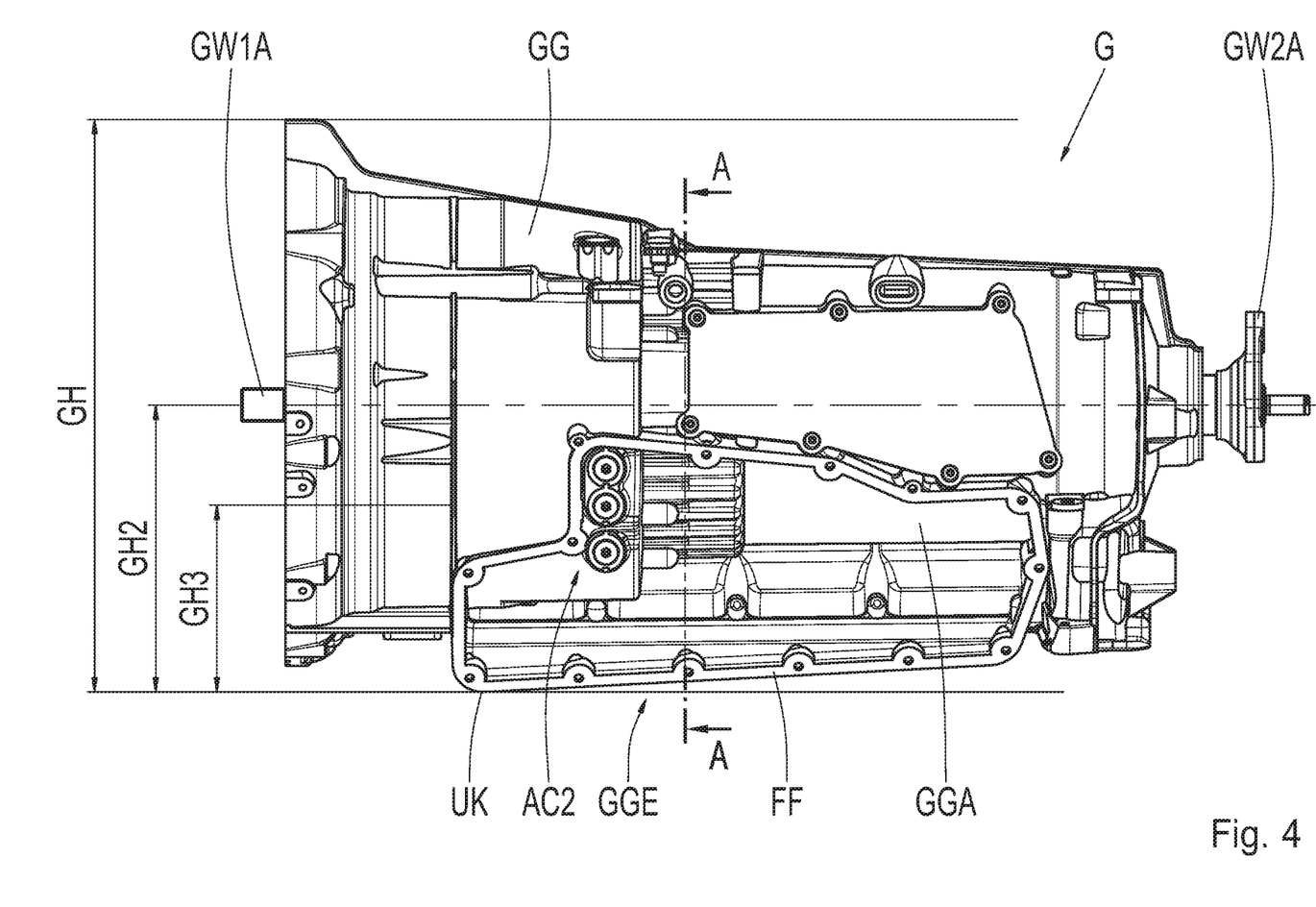
FIG. 4 shows a side view of a transmission according to example aspects of the invention with the power electronics module removed.

FIG. 4 shows a side view of a transmission G. The configuration of the transmission G can correspond, by way of example, to one of the embodiments represented in FIG. 1 through FIG. 3. The transmission G also includes an electric machine EM, which is arranged in the interior of the housing GG and, therefore, is not visible in FIG. 4. The housing GG includes a region GGE on an outer wall GGA, which is closable with the aid of a power electronics module LE (not represented in FIG. 4). The region GGE is delimited by a mounting face FF, which forms the mechanical interface between the housing GG and the power electronics module LE. A phase interface AC2 is arranged in the region GGE, which is associated with the electric machine EM arranged within the housing GG.

The region GGE is located between a lower edge UK of the transmission housing GG and one-half of the overall height GH2 of the transmission housing GG. The region GGE extends, in sections, above the lowermost third GH3 of the overall height GH of the transmission housing GG. The phase interface AC2 is partially located in a section of the region GGE, which extends above the lowermost third GH3 of the overall height GH of the transmission housing GG.

Figure 5:
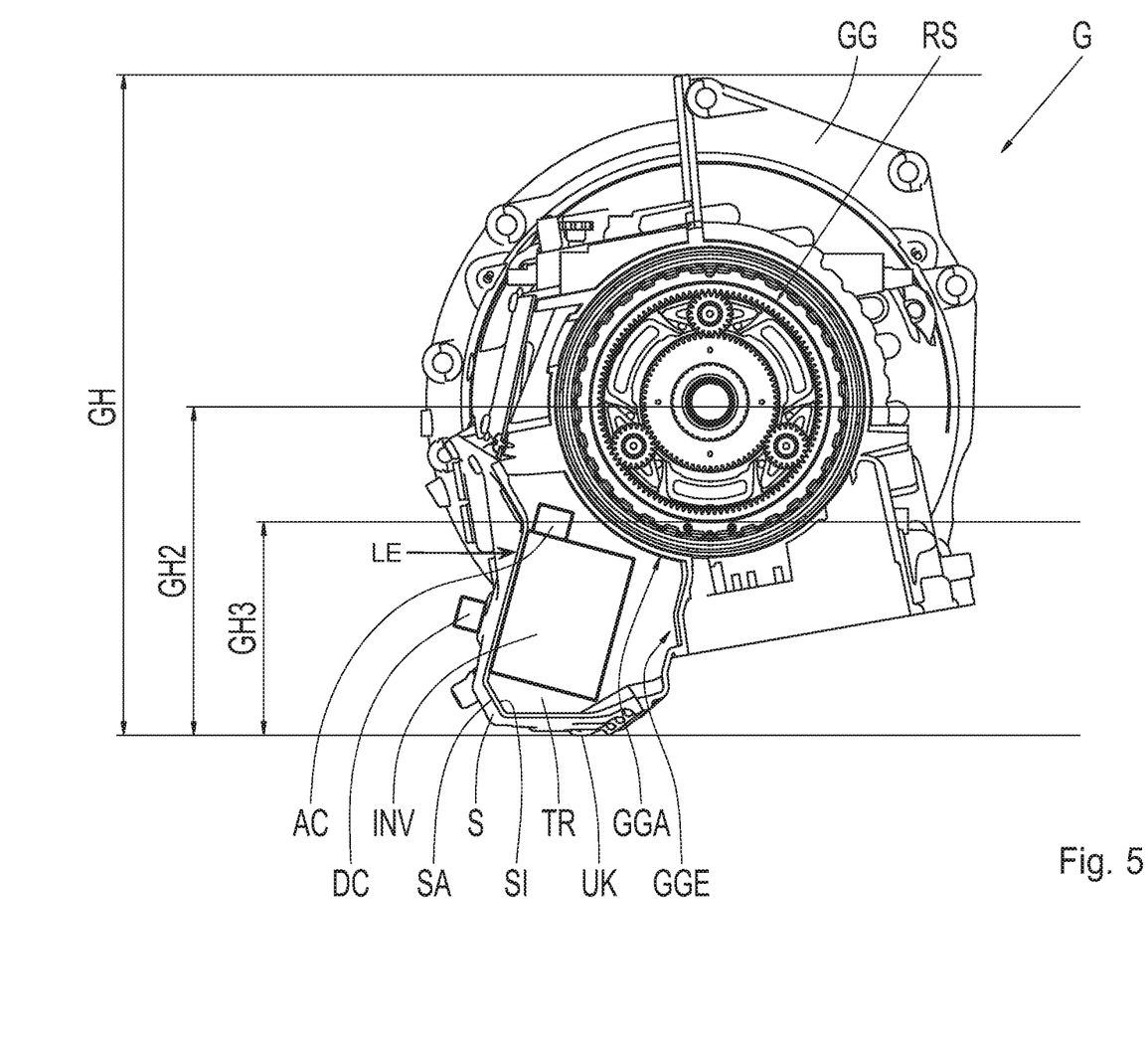
FIG. 5 shows a sectional view of the transmission according to example aspects the invention with the power electronics module installed.

FIG. 5 shows a sectional view of the transmission G according to example aspects of the invention, wherein the power electronics module LE is mounted on the transmission housing GG. The cutting plane A indicated in FIG. 4 extends through the gear set RS, so that the gear set RS is partially visible in FIG. 5. The power electronics module LE includes a carrier element S having an inner side SI and having an outer side SA, a DC voltage terminal DC, an inverter INV, and an AC voltage terminal AC connected to the phase interface AC2 (FIG. 4). The inverter INV is attached to the inner side SI of the carrier element S. The region GGE of the housing GG and the inner side SI of the carrier element S form a dry space TR for accommodating the inverter INV. In the cutting plane A, the region GGE of the housing GG separates the gear set RS from the dry space TR.

The AC voltage terminal AC is arranged within the dry space TR, and is only partially visible in the sectional view provided. A section of the AC voltage terminal AC is located above the lowermost third GH3 of the overall height GH of the transmission housing GG. The DC voltage terminal DC is arranged on the outer side SA of the carrier element S and is located within the lowermost third GH3 of the overall height GH of the transmission housing GG.

Figure 6:
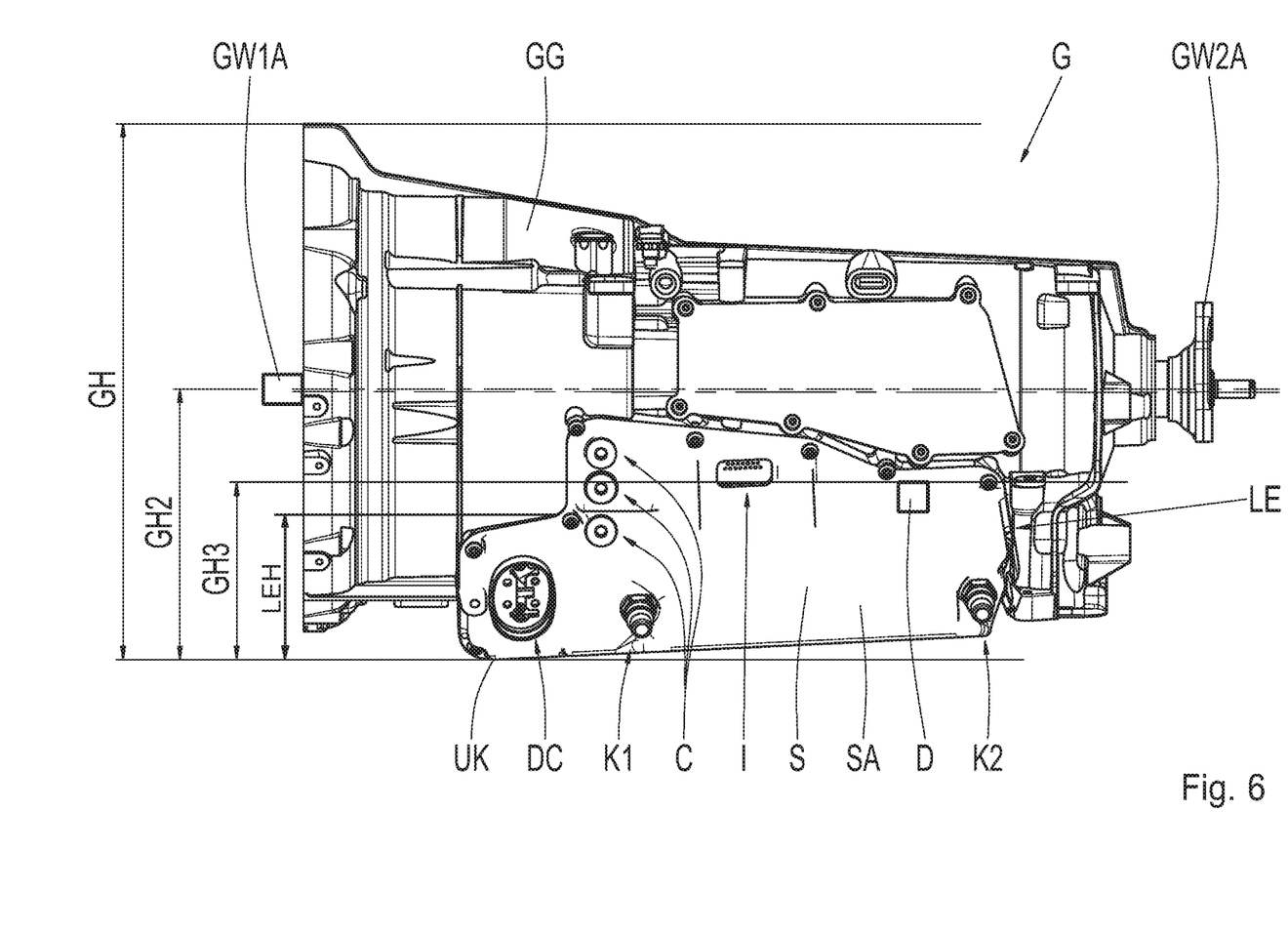
FIG. 6 shows a side view of the transmission according to example aspects of the invention with the power electronics module installed.

FIG. 6 shows a side view of the transmission G according to example aspects of the invention, wherein, in contrast to the representation in FIG. 4, the power electronics module LE is mounted on the housing GG. It is clearly apparent that the power electronics module LE extends, to a preponderant extent, along the lowermost third GH3 of the overall height GH of the transmission housing GG. The carrier element S includes multiple openings, which are closed with the aid of covers C. If the covers C are removed, the AC voltage terminal AC arranged on the inner side SI of the carrier element S is accessible from the outer side SA.

The power electronics module LE includes a cooling water/fluid inflow connection K1 and a cooling water/fluid outflow connection K2, which are arranged on the outer side SA of the carrier element S. Via the cooling water/fluid inflow connection K1, cooling water/fluid can be routed to a heat exchanger of the power electronics module LE. The heat exchanger is in thermal contact with power semiconductors of the inverter INV, so that the power semiconductors can dissipate thermal energy to the heat exchanger. The supplied cooling water/fluid heats up in the heat exchanger. The cooling water/fluid is routed out of the power electronics module LE via the cooling water outflow connection K2. The cooling water/fluid heated in this way can be routed to a preferably transmission-external, further heat exchanger.

The power electronics module LE includes a signal connector I on the outer side SA of the carrier element S. The signal connector I is configured for transmitting signals between an element of the power electronics module LE, in particular a control unit of the inverter INV, and a transmission-external control unit ECU (not represented in FIG. 6). Moreover, the power electronics module LE includes a pressure compensating element D, with the aid of which the dry space TR is connected to the surroundings. As a result, an accumulation of moisture in the dry space TR, induced by a pressure difference between the surroundings and the dry space TR, can be avoided.

Figure 7:
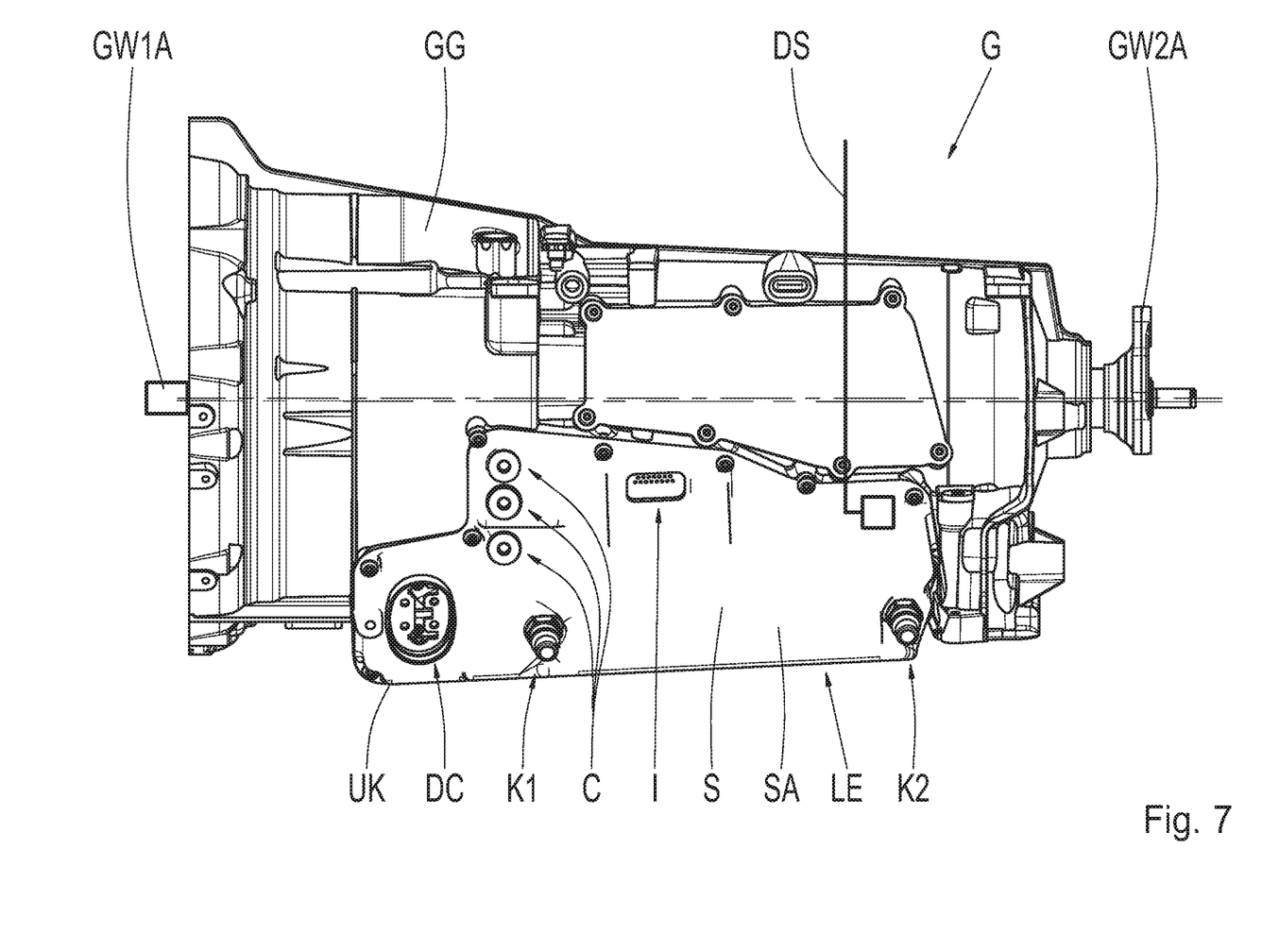
FIG. 7 shows a side view of a variant of the transmission according to example aspects the invention with the power electronics module installed.

FIG. 7 shows a side view of a variant of the transmission G according to example aspects of the invention, which essentially corresponds to the transmission G represented in FIG. 6. Instead of the pressure compensating element D, the carrier element S now includes a connection for a vent line DS. With the aid of the vent line DS, the dry space TR is connected to the surroundings. The free end of the vent line DS can be arranged in a high-level and water-protected region in the motor vehicle, which is equipped with such a transmission G.

Figure 8:
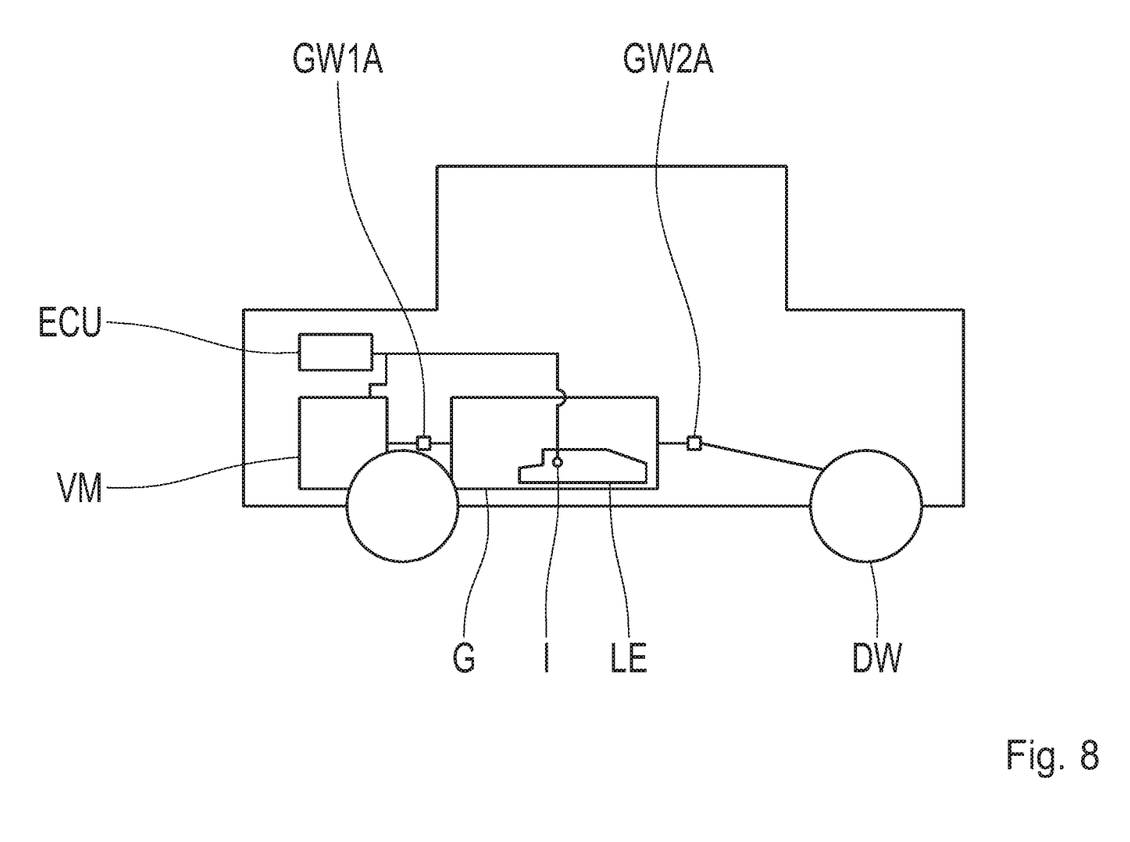
FIG. 8 shows a diagrammatic view of a motor vehicle including the transmission according to example aspects of the invention.

FIG. 8 shows a diagrammatic view of a motor vehicle including the transmission G according to example aspects of the invention. The transmission G is connected to an internal combustion engine VM via the input interface GW1A. Via the output interface GW2A, the transmission G is connected to a differential gear (not represented), via which the power present at the output shaft GW2 is distributed to driving wheels DW of the motor vehicle.

The motor vehicle includes a control unit ECU, which is configured for the open-loop control of hybrid drive functions of the motor vehicle. The control unit ECU is connected for this purpose to the internal combustion engine VM and via the signal connector I to the power electronics module LE of the transmission G for signal transmission. The control unit ECU can be connected to further components of the motor vehicle, for example, to a battery.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS

G transmission
GW1 input shaft

GW2 output shaft
GW1A input interface
GW2A output interface
RS gear set
RSx gear set element
EM electric machine
AC2 phase interface of the electric machine
GG housing
GGE region of the housing
GGA outer wall of the housing
FF mounting face
UK lower edge of the housing
GH overall height of the housing
GH2 one-half of the overall height of the housing
GH3 one-third of the overall height of the housing
LE power electronics module
S carrier element
SI inner side of the carrier element
SA outer side of the carrier element
DC DC voltage terminal
AC AC voltage terminal
INV inverter
A cutting plane
TR dry space
C cover
K1 cooling water inflow connection
K2 cooling water outflow connection
I signal connector
ECU control unit
D pressure compensating element
DS vent line
VM internal combustion engine
K0 separating clutch
AN connection shaft
DW driving wheel

The invention claimed is:

1. A transmission (G) for a motor vehicle, comprising
a housing (GG);
a gear set (RS) arranged within the housing (GG) for forming multiple gear ratios between an input shaft (GW1) and an output shaft (GW2) of the transmission (G);
an electric machine (EM) operatively connected to the input shaft (GW1), the output shaft (GW2), or an element (RSx) of the gear set (RS); and
a power electronics module (LE) comprising a carrier element (S), a DC voltage terminal (DC), an inverter (INV), and an AC voltage terminal (AC), the carrier element (S) having an inner side (SI) and an outer side (SA), the AC voltage terminal (AC) connected to a phase interface (AC2) of the electric machine (EM),
wherein the housing (GG) comprises a region (GGE) for accommodating the power electronics module (LE) on an outer wall (GGA) of the housing (GG), the region (GGE) closable with the carrier element (S) of the power electronics module (LE),
wherein the region (GGE) of the housing (GG) and the inner side (SI) of the carrier element (S) form a dry space (TR) for receipt of the inverter (INV) attached to the carrier element (S), and
wherein the region (GGE) of the housing (GG) at least partially separates the gear set (RS) from the dry space (TR).

2. The transmission (G) of claim 1, wherein the power electronics module (LE) is arranged laterally on the transmission housing (GG).

3. The transmission (G) of claim 1, wherein the transmission (G) further comprises an input interface (GW1A) and an output interface (GW2A), the input interface (GW1A) and the output interface (GW2A) arranged on opposite ends of the transmission (G), the power electronics module (LE) arranged between the input interface (GW1A) and the output interface (GW2A), the power electronics module (LE) at least partially extending up to and above a lowermost third (GH3) of an overall height (GH) of the transmission housing (GG).

4. The transmission (G) of claim 1, wherein that the region (GGE) of the housing (GG) is located between a lower edge (UK) of the transmission housing (GG) and one-half (GH2) of an overall height (GH) of the transmission housing (GG), and the region (GGE) at least partially extends above a lowermost third (GH3) of the overall height (GH) of the transmission housing (GG).

5. The transmission (G) of claim 4, wherein at least a portion of the AC voltage terminal (AC) is arranged in a section of the power electronics module (LE) that extends above the lowermost third (GH3) of the overall height (GH) of the transmission housing (GG).

6. The transmission (G) of claim 4, wherein at least a portion of the power electronics module (LE) has a smaller overall height than the lowermost third (GH3) of the overall height (GH) of the transmission housing (GG).

7. The transmission (G) of claim 6, wherein the DC voltage terminal (DC) is arranged in a section of the power electronics module (LE) that has a smaller overall height (LEH) than the lowermost third (GH3) of the overall height (GH) of the transmission housing (GG).

8. The transmission (G) of claim 1, wherein the power electronics module (LE) extends, to a preponderant extent, along a lowermost third (GH3) of an overall height (GH) of the transmission housing (GG).

9. The transmission (G) of claim 1, wherein the carrier element (S) comprises a plurality of openings, and the plurality of openings are closable with one or more covers (C).

10. The transmission (G) of claim 9, wherein the AC voltage terminal (AC) is arranged on the inner side (SI) of the carrier element (S), and the AC voltage terminal (AC) is accessible through the plurality of openings from an outer side (SA) of the carrier element (S).

11. The transmission (G) of claim 1, wherein the DC voltage terminal (DC) is arranged on the outer side (SA) of the carrier element (S).

12. The transmission (G) of claim 1, wherein the power electronics module (LE) comprises a cooling fluid inflow connection (K1) and a cooling fluid outflow connection (K2), and the cooling fluid inflow and outflow connections (K1, K2) are arranged on the outer side (SA) of the carrier element (S).

13. The transmission (G) of claim 1, wherein the power electronics module (LE) comprises a signal connector (I) on the outer side (SA) of the carrier element (S), and the signal connector (I) is configured for transmitting one or more signals between the power electronics module (LE) and a transmission-external control unit (ECU).

14. The transmission (G) of claim 1, wherein the carrier element (S) comprises a pressure compensating element (D) for connecting the dry space (TR) to ambient atmosphere.

15. The transmission (G) of claim 1, wherein the carrier element (S) comprises a connection for a vent line (DS).

16. The transmission (G) of claim 1, wherein the dry space (TR) is connected to ambient atmosphere via at least one bore hole in the housing (GG).

17. A motor vehicle comprising the transmission (G) of claim 1.

* * * * *